Figure 1:
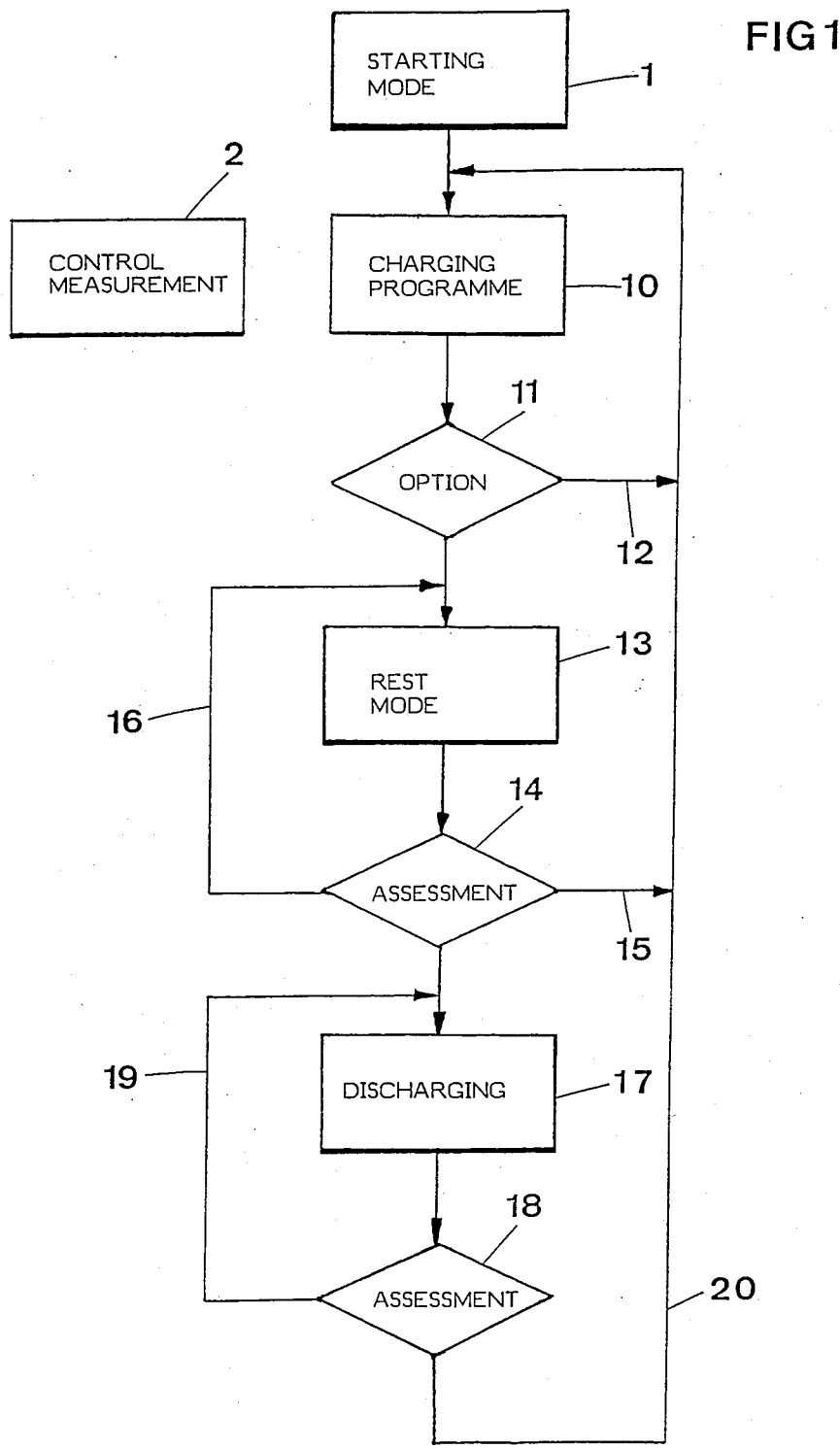

United States Patent [19]

Wahlström

[11] Patent Number: 4,742,289
[45] Date of Patent: May 3, 1988

[54] METHOD FOR THE CYCLICAL TRICKLE CHARGING OF A CHARGEABLE BATTERY INTENDED FOR EMERGENCY OPERATION

[76] Inventor: Tommy Wahlström, Pl 4571, S-434 00 Kungsbacka, Sweden

[21] Appl. No.: 863,259
[22] PCT Filed: Sep. 19, 1985
[86] PCT No.: PCT/SE85/00359
§ 371 Date: May 6, 1986
§ 102(e) Date: May 6, 1986
[87] PCT Pub. No.: WO86/01948
PCT Pub. Date: Mar. 27, 1986

[30] Foreign Application Priority Data

Sep. 19, 1984 [SE] Sweden ............................. 8404690

[51] Int. Cl.$^4$ ............................................. H02J 7/00
[52] U.S. Cl. ......................................... 320/14; 320/31; 320/37; 320/39; 320/22
[58] Field of Search ........................ 320/14, 21, 22–24, 320/31, 32, 39, 40, 37, 38

[56] References Cited

U.S. PATENT DOCUMENTS

| | | | |
|---|---|---|---|
| 3,500,167 | 3/1970 | Applegate et al. | 320/14 |
| 3,886,427 | 5/1975 | Long | 320/22 |
| 4,136,310 | 1/1979 | Foster | 320/37 |
| 4,302,714 | 11/1981 | Yefsky | 320/14 X |

Primary Examiner—R. J. Hickey
Attorney, Agent, or Firm—Jeffers, Hoffman & Niewyk

[57] ABSTRACT

The present invention relates to a method for the cyclical trickle charging of a chargeable battery intended for emergency operation. The charging voltage used for this purpose is the output voltage from a source of d.c. voltage providing a variable level of output voltage. A characteristic feature of the invention is the fact that charging from a starting mode (1) is executed in accordance with a cyclical charging program (10) which is repeated until the battery has been found to be fully charged. A rest mode (13) then occurs during which the battery is not charged, but the battery voltage is measured continuously. The rest mode (13) is interrupted immediately, and the aforementioned charging program (10) is re-started if it is noted in the course of measuring the voltage that the battery voltage has dropped below a first pre-determined value. Once the rest mode (13) has lasted for a pre-determined period, a discharging phase (17) will be initiated which involves the battery being discharged in accordance with a discharging program during which the battery voltage is measured continuously. The discharging phase (17) is interrupted if it is noted in the course of measuring the voltage that the battery voltage has dropped below a second pre-determined value. Once the discharging phase (17) has been interrupted or completed, the charging program (10) is re-started.

5 Claims, 2 Drawing Sheets

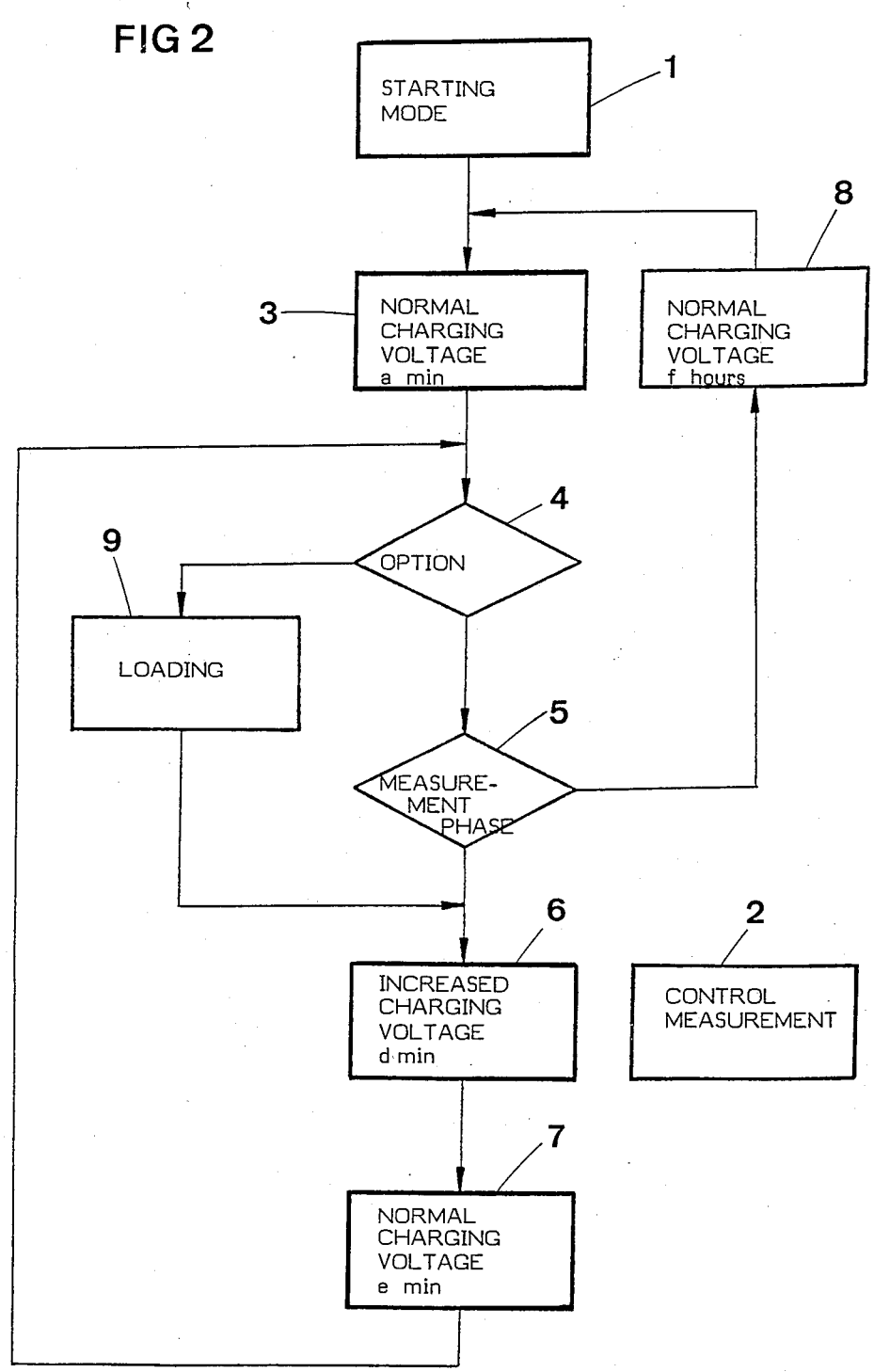

METHOD FOR THE CYCLICAL TRICKLE CHARGING OF A CHARGEABLE BATTERY INTENDED FOR EMERGENCY OPERATION

The present invention relates to a method for the cyclical trickle charging of a chargeable battery intended for emergency operation, in which case the charging voltage used is the output voltage from a source of d.c. voltage providing a variable level of output voltage, said source of voltage being connected to the battery via a charging regulator.

Batteries of this kind are usually part of a group of batteries in which the number of batteries is determined by the number of Ampere-hours which need to be available when the regular mains electricity supply fails. When this occurs it is important for the battery to function in the intended manner. A further requirement is that the battery is fully charged and exhibits the specified battery voltage. If this is not the case the battery may suffer damage, or at any rate be impaired, within such a relatively short interval of time as one year.

The battery is trickle charged in order to keep it at a high level of readiness for emergency operation, and this takes place in a conventional manner by connecting a continuous charging voltage across the battery, by means of which the battery voltage is made to stay at the specified value. The battery will suffer damage in spite of such trickle charging, mainly for the reason that it is unable to operate in the manner for which it was constructed and dimensioned.

The object of the present invention is to make available a method of charging of the kind referred to by way of introduction which does not suffer from the aforementioned disadvantages. The way in which this is achieved is for charging to be executed from a starting mode in accordance with a cyclical charging program which is repeated until the battery has been found to be fully charged, whereupon a rest mode will occur during which the battery is not charged, but the battery voltage is measured continuously, whereupon the rest mode is interrupted immediately and the aforementioned charging program is re-started if it is noted in the course of measuring the voltage that the battery voltage has dropped below a first pre-determined value, whereupon, if the rest mode has lasted for a pre-determined interval of time, a discharging phase will be initiated which involves the battery being discharged in accordance with a discharging program during which the battery voltage is measured continuously, whereupon the discharging phase will be interrupted if it is noted in the course of measuring the voltage that the battery voltage has dropped below a second pre-determined value, whereupon, once the discharging phase has been interrupted or completed, the charging program will be re-started.

According to another characteristic feature of the invention charging is executed in such a way that charging from a starting mode is executed at a normal charging voltage for an interval of time (a) consisting of a single number of minutes, whereupon an assessment is made whether a considerably longer interval of time b in relation to the interval of time a, preferably a single number of days, has elapsed since the starting mode, whereupon, if this is not the case, a check is made during a measurement phase whilst the battery is subjected to load of whether the battery voltage drops below a certain value within a certain interval of time c of the same order of magnitude as, but shorter than the interval of time a, whereupon, if this is the case, charging takes place at an increased voltage for an interval of time d of the same order of magnitude as, but longer than the interval of time a, followed by charging at a normal charging voltage for an interval of time e of the same order of mgnitude as, but shorter than the interval of time a, whereupon the aforementioned assessment is made once more, whereupon, if the battery voltage does not drop below the aforementioned value within the aforementioned interval of time e, charging takes place at a normal charging voltage for an interval of time f consisting of a single number of hours, whereupon the charging cycle reverts to the point after the starting mode, whereupon, if the considerably longer interval of time b in relation to the interval of time a has elapsed since the starting mode the battery will be subjected to load for a certain interval of time or until the battery voltage has dropped to a pre-determined value, depending on the capacity of the battery, whereupon the charging cycle will revert to charging at the increased charging voltage during the aforementioned interval of time.

The invention is explained in greater detail below with reference to the accompanying drawing, in which FIG. 1 is a flow chart which illustrates the method according to the invention for the cyclical trickle charging of a battery.

FIG. 2 is a flow chart which shows an alternative method according to the invention for the trickle charging of a battery.

The reference designation 1 is used in FIG. 1 to indicate a starting mode during which certain routine control measurements, amongst other things, are performed, as indicated by a block 2. The starting mode 1 is followed by a charging program which involves charging at a number of different voltages for different intervals of time, plus measurements, for instance in accordance with a program which is identical or similar to that which will be described in relation to FIG. 2. The charging program is represented in FIG. 1 by a block 10. The block identified by the FIG. 11 indicates an option stage at which an assessment is made of whether the battery has been fully charged during the charging program. If this is not the case the charging program 10 is repeated, as indicated by the arrow 12.

If the battery has been fully charged a rest mode 13 will occur, during which the battery will not be charged. The battery voltage is monitored continuosuly during the rest mode, and this will be interrupted immediately and replaced by the charging program 10, indicated by an arrow 15 connected to the arrow 12, if it is found in assessment block 14 that the battery voltage has dropped below a pre-determined value, for example by 1.3% of the battery voltage. A drop in the battery voltage may be attributable to spontaneous discharging or to the connection of an external load to the battery.

A check is also made in assessment block 14 whether the rest mode has lasted for a pre-determined number of days, for example 10 days. If this is not the case the rest mode will continue, as indicated by an arrow 16 in FIG. 1. If the rest mode has lasted for the specified interval of time a discharging phase 17 will be initiated, during which the battery voltage is measured and the battery is discharged at a constant current for an interval of time whose length is determined by the size of the battery.

The battery voltage is measured in order to assess, as indicated by block 18 in FIG. 1, whether the battery voltage drops during the discharging program below a pre-determined value, for example by 1.6% of the battery voltage when the battery is fully charged. Should this not be the case the discharging phase will continue, as indicated by an arrow 19. Once the battery voltage has dropped below the aforementioned pre-determined value, the discharging phase is terminated and the charging program is re-started, as indicated in FIG. 1 by an arrow 20 connected to the arrows 12 and 15. The battery is reconditioned during the discharging phase, and the charging method described above gives the battery an increased service life compared with conventional charging methods and guarantees that the battery is fully charged at all times.

As before, the reference designation 1 is used in FIG. 2 to indicate the starting mode, and the designation 2 to indicate routine control measurements. The starting mode 1 is followed by a charging period, represented by a block 3 in the flow chart in accordance with FIG. 2. During this charging period charging of the battery takes place for a period of about 5 minutes at a voltage about 17% greater than the battery voltage. Charging is executed for an interval of time a consisting of a single number of minutes, preferably about 5 minutes. The block identified by the FIG. 4 indicates an option stage at which an assessment is made whether a considerably longer interval of time b in relation to the interval of time a has elapsed since the starting mode 1. The interval of time b amounts to a single number of days. If it is found at the optional stage 4 that an interval of time of the specified order of magnitude has not elapsed, the next stage in the flow chart is a measurement phase 5 during which, for a certain interval of time c, a check is made whether or not the battery voltage drops below a certain value. The interval of time c is of the same order of magnitude as, but less than the interval of time a, with an appropriate value being about 1 minute. If this is the case charging will take place in two stages, indicated by 6 and 7 respectively in the Figure, whereupon the assessment in accordance with 4 is repeated. During charging stage 6 charging of the battery will take place at an increased charging voltage for an interval of time d which is of the same order of magnitude as, but longer than the interval of time a. This increased charging voltage means that its value is of the order of 22% above the battery voltage, with an appropriate value for d being about 8 minutes. The following charging stage 7 involves charging at a normal charging voltage for an interval of time e which is of the same order of magnitude as the interval of time a, but is shorter than the latter; an appropriate value is about 2 minutes. The advantage of dividing up the charging operation into two stages in accordance with the above is that the following measurements are more reliable if charging at a normal charging voltage has preceded the measurement operation.

If it is found during measurement phase 5 that the battery voltage does not drop below the aforementioned value $U_{min}$ during the interval of time c, charging will take place in two stages, of which the first in FIG. 2 is designated by 8 and the second is identical with charging stage 3. During charging stage 3 charging of the battery takes place at a normal charging voltage during an interval of time f which consists of a single number of hours, preferably 3 hours.

If it is found at assessment stage 4 that the interval of time b hsa elapsed since the starting mode 1, the charging cycle will enter a load phase 9 which is followed by charging stage 6. During the loading phase 9 the battery is subjected to resistive loading, either for a certain interval of time or until the battery voltage $U_B$ has dropped to a pre-determined value $U_M$. The capacity of the battery determines the manner in which the load phase 9 is executed.

I claim:

1. A method for reconditioning and cyclically trickle charging by a variable direct current (d.c.) source a chargeable battery, which battery has a specified battery voltage and is particularly intended for emergency operations, said method comprising:
    (1) defining a starting mode as a reference condition, which starting mode includes routine control measurements;
    (2) charging said battery in conformance with a charging program wherein said battery is charged by said variable d.c. voltage source at a plurality of different voltages for a plurality of different time periods;
    (3) measuring said battery voltage after charging and comparing said measured voltage to said specified battery voltage;
    (4) selecting one of again charging said battery and thereafter measuring said battery voltage at a measured voltage below said battery voltage, and providing a rest mode when said measured voltage is at least at said specified battery voltage;
    (5) continuously measuring said battery voltage during said rest mode and comparing said voltage to a predetermined first battery voltage;
    (6) charging said battery with said variable d.c. source according to said charging program to said specified battery voltage when said battery voltage is less than said predetermined first battery voltage;
    (7) monitoring continuously the duration of said rest period and comparing the elapsed time to a predetermined time period;
    (8) discharging said battery according to a discharge program when the elapsed time is equal to said predetermined time period;
    (9) continuously monitoring said battery voltage during said discharge program and comparing said voltage to a predetermined second battery voltage; and,
    (10) iterating said charging, measuring and monitoring steps to charge said battery according to said charging program after said monitored battery voltage has decreased below said predetermined second battery voltage.

2. A method according to Patent claim 1, characterized in that the charging program includes a number of different charging voltages, measurements and time intervals.

3. A method according to Patent claim 1, characterized in that the pre-determined time period is a single number of days.

4. A method according to Patent claim 1, characterized in that during the discharging phase the battery is discharged at a constant current for an interval of time selected depending on the size of the battery.

5. A method for reconditioning and cyclically trickle charging a chargeable battery by a variable voltage, direct current (d.c.) source, said battery particularly intended for emergency operations, said method comprising:
    (1) providing a voltage regulator coupled between said variable voltage, d.c. source and said battery;

(2) defining a starting mode as a reference condition, which starting mode includes routine control measurements;
(3) charging said battery at a predetermined normal charging voltage ($U_N$) for a first interval of time (a), said first interval of time (a) being a single number of minutes;
(4) determining a second time interval (b) between starting modes, comparing said second time interval (b) to said first time interval (a) and defining a longer second interval preferably on the order of days and a shorter second interval considerably less than said longer second interval;
(5) measuring continuously the battery voltage and electing one of step 6 for said shorter second interval and step 7 for said longer second interval;
(6) providing a load to said battery for a third time interval (c), measuring the voltage drop ($U_B$) and comparing it to a predetermined first voltage ($U_{min}$) for said third time interval (c), which third time interval (c) is less than said first time interval (a) but of the same order of magnitude,
charging said battery at an increased voltage ($U_F$) for a fourth interval of time (d) greater than but of the same order of magnitude as said first interval of time (a) and thereafter charging said battery at said normal charging voltage ($U_N$) for a fifth interval of time (e) shorter than said first interval of time (a),
measuring and comparing again the voltage drop ($U_B$) against the first voltage ($U_{min}$) for third time interval (c) to iterate the noted fast charging cycle before measuring the voltage drop ($U_B$),
charging said battery at said normal charging voltage ($U_N$) for a sixth interval of time (f) of a single number of hours and thereafter reverting to said starting mode evaluation; and,
(7) providing a load to said battery for one of a seventh interval of time and until said battery voltage has decreased to a predetermined value, which is dependent upon the battery capacity, and thereafter charging said battery at said increased charging voltage ($U_F$) for said fourth interval of time (d).

* * * * *